US008432339B2

(12) United States Patent
Morgan

(10) Patent No.: US 8,432,339 B2
(45) Date of Patent: Apr. 30, 2013

(54) SYSTEM AND METHOD FOR INCREASING BIT-DEPTH IN A VIDEO DISPLAY SYSTEM USING A PULSED LAMP

(75) Inventor: Daniel J. Morgan, Denton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2694 days.

(21) Appl. No.: 11/058,889

(22) Filed: Feb. 16, 2005

(65) Prior Publication Data

US 2006/0181653 A1    Aug. 17, 2006

(51) Int. Cl.
*G09G 3/34*    (2006.01)

(52) U.S. Cl.
USPC ..... 345/84; 359/223.1; 359/226.2; 359/226.3

(58) Field of Classification Search ............. 345/84–85, 345/63; 359/223–226, 227
See application file for complete search history.

(56) References Cited

U.S. PATENT DOCUMENTS

| | | | |
|---|---|---|---|
| 5,712,650 A * | 1/1998 | Barlow | 345/55 |
| 5,812,303 A | 9/1998 | Hewlett et al. | |
| 6,008,785 A | 12/1999 | Hewlett et al. | |
| 6,535,187 B1 * | 3/2003 | Wood | 345/84 |
| 2002/0196377 A1 * | 12/2002 | Furukawa et al. | 348/742 |
| 2003/0227677 A1 * | 12/2003 | Doherty et al. | 359/449 |

* cited by examiner

*Primary Examiner* — Alexander Eisen
*Assistant Examiner* — Cory Almeida
(74) *Attorney, Agent, or Firm* — Warren L. Franz; Wade J. Brady, III; Frederick J. Telecky, Jr.

(57) ABSTRACT

In accordance with the teachings of the present invention, a system and method for increasing the bit-depth of a video display system using a pulse lamp are provided. In one embodiment, the method includes illuminating a digital micro-mirror device with a light source having a variable power supply, receiving a signal indicating the light output provided to the digital micro-mirror device by the light source should be reduced to a target level during a predetermined time period, reducing a power supplied to the light source by the variable power supply in response to the signal such that the light output of the light source is reduced to about a target level during the predetermined time period, displaying a least significant bit on the digital micro-mirror device during the predetermined time period, and decreasing a speed of a master clock controlling the digital micro-mirror device in response to the light output of the light source deviating below the target level during the predetermined time period.

15 Claims, 3 Drawing Sheets

SYSTEM AND METHOD FOR INCREASING BIT-DEPTH IN A VIDEO DISPLAY SYSTEM USING A PULSED LAMP

TECHNICAL FIELD

This invention relates generally to video display systems employing spatial light modulators, and more particularly to a system and method for increasing bit-depth in a video display system using a pulsed lamp

BACKGROUND

Spatial light modulators are devices that may be used in a variety of optical communication and/or video display systems. These device generate an image by controlling a plurality of individual elements that deflect light to form the various pixels of the image. One example of a spatial light modulator is a digital micro-mirror device ("DMD").

Typically, spatial light modulators, such as DMDs, operate by pulse width modulation ("PWM"). Generally, the incoming data signal or image is digitized into samples using a predetermined number of bits for each element. This predetermined number of bits is often referred to as the "bit-depth" of the modulator, particularly in systems employing binary bit weights. Generally, the greater the bit-depth, the greater the number of colors (or shades of gray) the modulator can display. For spatial light modulators, the number of bits assigned to a pixel typically depends on the perceived brightness for the pixel for a particular frame. Thus, the greater the value of the pixel code associated with the pixel, the greater the amount of time the pixel is illuminated during the frame. The most significant bit ("MSB") is displayed the longest amount of time during the frame, while the least significant bit ("LSB") is displayed the shortest amount of time during the frame. The size (or duration) of shortest LSB sets the brightness resolution (or bit-depth) that can be achieved for the pixel.

Since greater bit-depth can be used to produce greater detail in images, it is often desirable to increase the bit-depth of a video display system. Furthermore, increasing the bit-depth of the display system may reduce spatial contouring artifacts and/or temporal artifacts due to quantization noise. Unfortunately, the bit-depth of spatial light modulator-based display systems is limited by on the minimum size of the LSB, which is in turn limited by the minimum transition time of the individual elements of modulator. Some attempts at increasing the effective bit-depth of video display system have used dithering techniques, such as Blue-Noise STM, to overcome this limitation. However, these techniques, while increasing the effective number of bits (and thus end-user perceivable bit-depth) available via spatial and temporal dithering, may cause temporal dither noise that is noticeable in the images produced by the display systems.

SUMMARY OF THE INVENTION

In accordance with the teachings of the present invention, a system and method for increasing the bit-depth of a video display system using a pulsed lamp are provided. In one embodiment, the method comprises illuminating a digital micro-mirror device with a light source having a variable power supply, receiving a signal indicating the light output provided to the digital micro-mirror device by the light source should be reduced to a target level during a predetermined time period, reducing a power supplied to the light source by the variable power supply in response to the signal such that the light output of the light source is reduced to about a target level during the predetermined time period, displaying a least significant bit on the digital micro-mirror device during the predetermined time period, and decreasing a speed of a master clock controlling the digital micro-mirror device in response to the light output of the light source deviating below the target level during the predetermined time period.

A technical advantage of some embodiments of the present invention includes the ability to increase the bit-depth of a spatial light modulator-based video display system despite the mechanical limitations of the spatial light modulator. In particular embodiments, this increased bit-depth may be achieved with reduced spatial contouring artifacts and/or temporal artifacts due to dither noise.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of embodiments of the present invention and features and advantages thereof, reference is now made to the following description, taken in conjunction with the accompanying drawings, in which.

DETAILED DESCRIPTION OF EXAMPLE EMBODIMENTS

In accordance with the teachings of the present invention, a system and method for increasing the bit-depth of a video display system are provided. Generally, particular embodiments of the present invention increase the number of bits displayed by a spatial light modulator, such as a digital micro-mirror device ("DMD"), by reducing the light output from the light source illuminating the modulator and applying lower significance bits, herein referred to as "short bits," during the reduced light output. In this manner, the bit-depth, or number of colors the display system may display, may be increased without relying on dithering or other techniques that may introduce unwanted artifacts to the image being displayed. Although a particular embodiment is described herein in the context of a DMD, the teachings of the present invention are also applicable to other spatial light modulators, and are not limited to digital micro-mirror devices.

Figure 1:
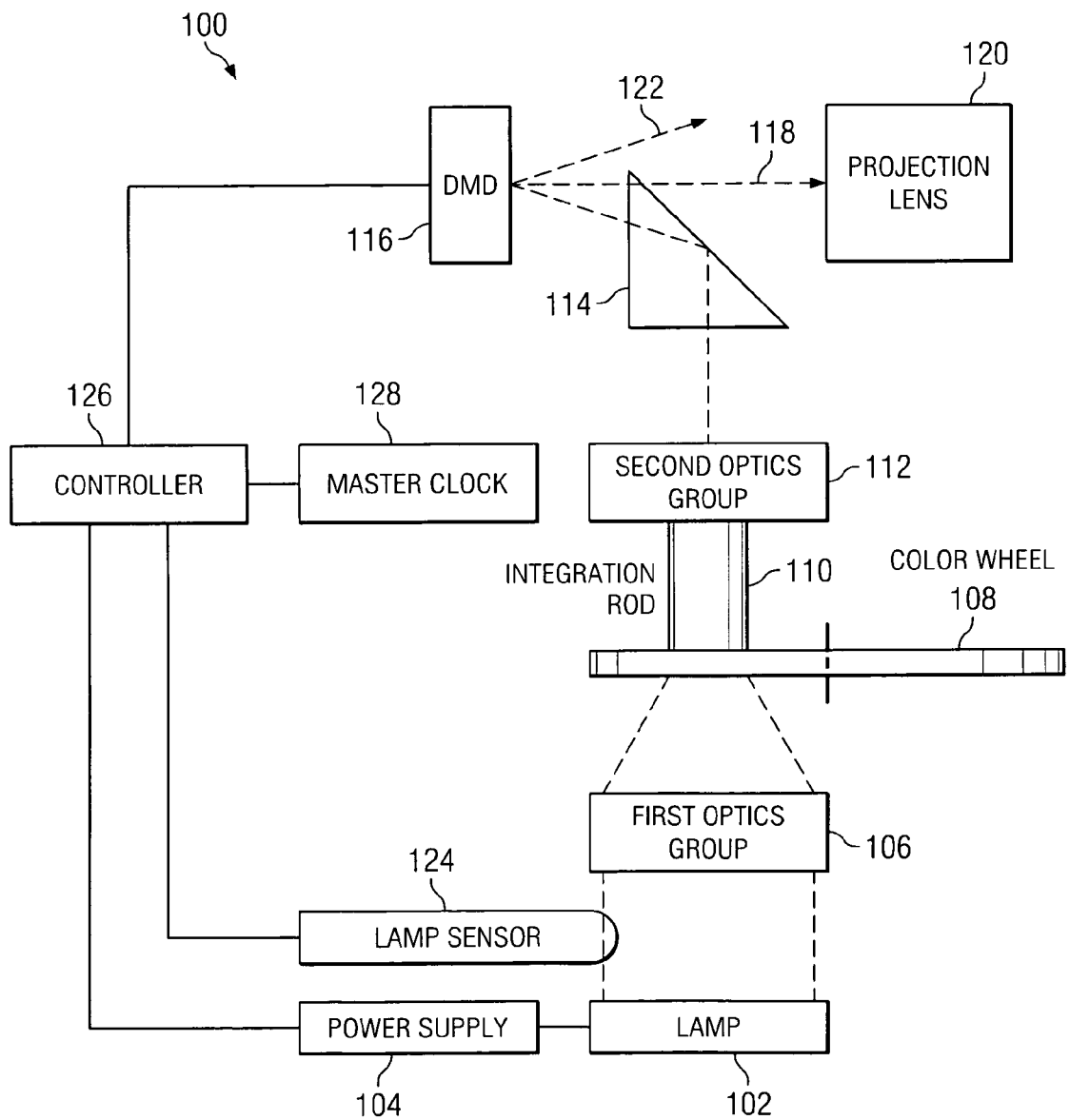
FIG. 1 illustrates a video display system in accordance with a particular embodiment of the present invention.

FIG. 1 illustrates a block diagram of one embodiment of a portion of a video display system 100 implementing a pulsed lamp 102 to increase the bit-depth of the system in accordance with the teachings of the present invention. In this example, video display system 100 includes pulsed lamp 102 capable of generating an illumination light beam and first optics group 106 capable of focusing the illumination light beam on an entrance pupil of an integration rod 110. Pulsed lamp 102 may comprise any suitable AC or DC light source, such as, for example, a metal halide light source or a xenon arc light source. First optics group 106 may comprise a condenser lens and/or any other suitable optical device.

In this particular embodiment, the illumination light beam passes through a color wheel 108 before entering integration rod 110. Color wheel 108 may comprise any device capable of modulating one of the primary (or other suitable) colors (e.g., red, green, and blue), in the path of the illumination light beam. Color wheel 108 enables the illumination light beam to be filtered so as to provide "field sequential" images. Color wheel 108 enables system 100 to generate a sequence of differently colored images that are perceived by a viewer through a projection lens 120 as a correctly colored image.

In this example, system 100 also includes a second optics group 112 capable of receiving the illumination light beam passing through integration rod 110 and capable of focusing the illumination light beam onto a modulator 116 through a prism assembly 114. Second optics group 112 may comprise, for example, a condenser lens and/or any other suitable optical device. Modulator 116 may comprise any device capable of selectively communicating at least some of the illumination light beam along a projection light path 118 and/or along an off state light path 122. In various embodiments, modulator 116 may comprise a spatial light modulator, such as, for example, a liquid crystal display or a light emitting diode modulator.

In this particular embodiment, modulator 116 comprises a DMD. A DMD is an electromechanical device comprising an array of thousands of tilting mirrors. Each mirror may tilt plus or minus ten degrees for the active "on" state or "off" state. To permit the mirrors to tilt, each mirror is attached to one or more hinges mounted on support posts, and spaced by means of an air gap over underlying control circuitry. The control circuitry provides electrostatic forces, based at least in part on image data received from a controller 126.

The electrostatic forces cause each mirror to selectively tilt. Incident illumination light on the mirror array is reflected by the "on" mirrors along projection path 118 for receipt by projection lens 120 and is reflected by the "off" mirrors along off state light path 122 for receipt by a light dump (not explicitly shown). The pattern of "on" versus "off" mirrors (e.g., light and dark mirrors) forms an image that is projected by projection lens 120. As shown in this example, video display system 100 only utilizes a single DMD. However, it should be recognized that the teachings of the present invention may also be applied to multiple-DMD systems.

Figure 2:
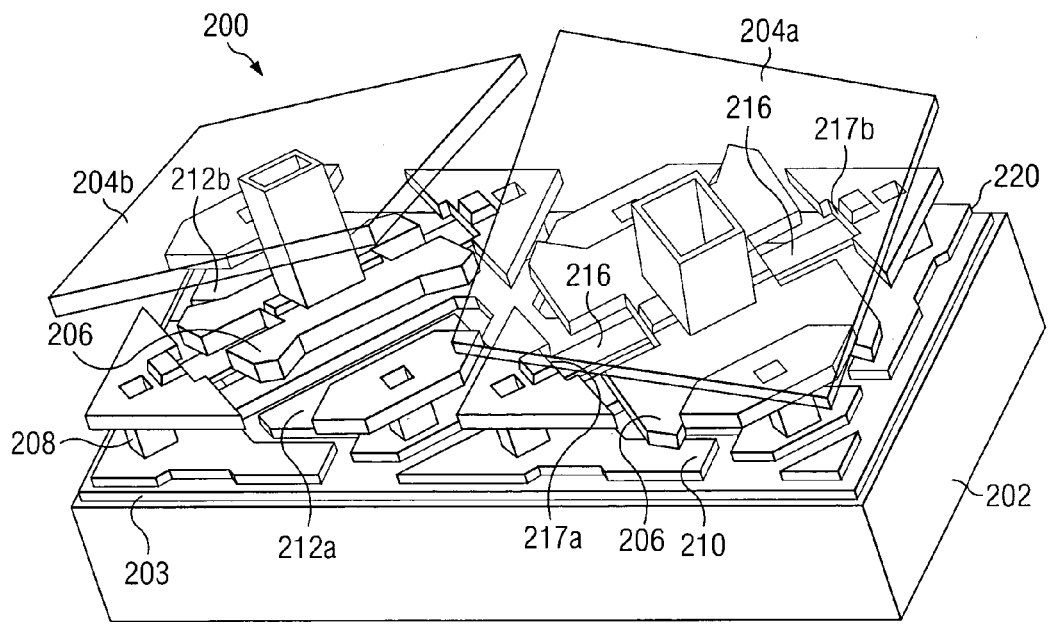
FIG. 2 illustrates a digital micro-mirror device that may be used in accordance with a particular embodiment of the present invention.

A better understanding of the DMD utilized as modulator 116 may be had by referring to FIG. 2. FIG. 2 illustrates a DMD 200 which may be used in a video display system in accordance with the teachings of the present invention. As shown in FIG. 2, DMD 200 comprises a micro electromechanical switching ("MEMS") device that includes an array of hundreds of thousands of tilting micro-mirrors 204. In this example, each micro-mirror 204 is approximately 13.7 square microns in size and has an approximately one micron gap between adjacent micro-mirrors. In some examples, each micro-mirror can be less than thirteen square microns in size. In other examples, each micro-mirror can be approximately seventeen square microns in size. In addition, each micro-mirror 204 may tilt up to plus or minus ten degrees creating an active "on" state condition or an active "off" state condition. In other examples, each micro-mirror 204 may tilt plus or minus twelve degrees for the active "on" state or "off" state.

In this example, each micro-mirror 204 transitions between its active "on" and "off" states to selectively communicate at least a portion of an optical signal or light beam. To permit micro-mirrors 204 to tilt, each micro-mirror 204 is attached to one or more hinges 216 mounted on hinge posts 208, and spaced by means of an air gap over a complementary metal-oxide semiconductor ("CMOS") substrate 202. In this example, micro-mirrors 204 tilt in the positive or negative direction until yoke 106 contacts conductive conduits 210. Although this example includes yoke 206, other examples may eliminate yoke 206. In those examples, micro-mirrors 204 tilt in the positive or negative direction until micro-mirrors 204 contact a mirror stop (not explicitly shown).

In this particular example, electrodes 212 and conductive conduits 210 are formed within a conductive layer 220 disposed outwardly from an oxide layer 203. Conductive layer 220 can comprise, for example, an aluminum alloy or other suitable conductive material. Oxide layer 203 operates to insolate CMOS substrate 202 from electrodes 212 and conductive conduits 210.

Conductive layer 220 receives a bias voltage that at least partially contributes to the creation of the electrostatic forces developed between electrodes 212, micro-mirrors 204, and/or yoke 206. In this particular example, the bias voltage comprises a steady-state voltage. That is, the bias voltage applied to conductive layer 220 remains substantially constant while DMD 200 is in operation. In this example, the bias voltage comprises approximately twenty-six volts. Although this example uses a bias voltage of twenty-six volts, other bias voltages may be used without departing from the scope of the present disclosure.

In this particular example, CMOS substrate 202 comprises the control circuitry associated with DMD 200. The control circuitry can comprise any hardware, software, firmware, or combination thereof capable of at least partially contributing to the creation of the electrostatic forces between electrodes 212, micro-mirrors 204, and/or yoke 206. The control circuitry associated with CMOS substrate 102 functions to selectively transition micro-mirrors 204 between "on" state and "off" state based at least in part on data received from a controller (not explicitly shown).

In this particular example, micro-mirror 204a is positioned in the active "on" state condition, while micro-mirror 204b is positioned in the active "off" state condition. The control circuitry transitions micro-mirrors 204 between "on" and "off" states by selectively applying a control voltage to at least one of the electrodes 212 associated with a particular micro-mirror 204. For example, to transition micro-mirror 204b to the active "on" state condition, the control circuitry removes the control voltage from electrode 212b and applies the control voltage to electrode 212a. In this example, the control voltage comprises approximately three volts. Although this example uses a control voltage of approximately three volts, other control voltages may be used without departing from the scope of the present disclosure.

Generally, there is a response time associated with the movements of micro-mirrors 204 between the "on" state and the "off" state. It takes an interval of time, called the mirror flight time, for the mirror to assume the new position. In particular embodiments, this mirror flight time limits the minimum on-time of each micro-mirror 204 to approximately 16 µs. This 16 µs minimum on-time results in a maximum bit-depth of 8 bits.

Referring back to FIG. 1, video display system 100 attempts to overcome this 16 µs minimum on-time limitation by reducing the light output from lamp 102 and applying short bits during the low-light output, also referred to as "low pulse." Particular embodiments of the present invention accomplish this low pulse by reducing the power to the lamp 102 via an variable power supply 104. A PWM sequence is then used by controller 126 to cause modular 116 to display short bits during the low pulse, so that the low pulse and short bits are synchronized.

Generally, the intensity of pulsed lamp 102 is reduced by reducing the power supplied to the lamp by variable power supply 104. In particular embodiments utilizing an AC lamp, this may be achieved by briefly holding the current at zero during commutation, when the current already drops to zero. During a typical commutation, light transient undershoots normal occur as the current crosses zero.

This undershoot may be adjusted in amplitude and duration to yield a low pulse suitable to apply a short bit.

Other embodiments employing an AC lamp may reduce the power to lamp 102 between commutations, as the current does not necessarily have to change directions to apply the low pulse. Similarly, particular embodiments utilizing a DC lamp may have the power supplied to lamp 102 reduced briefly to result in the low pulse.

Generally, the particular reduction in light intensity will determine the increase in bit-depth possible using pulsed lamp 102. For example, if power to the lamp is reduced to 25% of its normal amplitude, then two more bits of bit-depth may be achieved in the case of binary bits, increasing bit-depth from 8 bits to 10 bits in this example. In particular embodiments of the present invention, this may be implemented by having two 25% light intensity low pulse intervals per frame of each color. The shortest bit applied would have an on-time of 16 µs. The use of the low pulse would then give an effective bit on-time of 4 µs, corresponding to a 10-bit LSB. During the next low pulse in the frame, a bit on-time of 32 µs could be shown, giving an effective bit on-time 8 µs. In total, when using the binary bit weights, the result is as follows.

| Bit | Number of Colors | Effective Bit On-Time (µs) |
| --- | --- | --- |
| B9 | 512 | 2048 |
| B8 | 256 | 1024 |
| B7 | 128 | 512 |
| B6 | 64 | 256 |
| B5 | 32 | 128 |
| B4 | 16 | 64 |
| B3 | 8 | 32 |
| B2 | 4 | 16 |
| B1 | 2 | 8 (32 µs during 25% low pulse) |
| B0 | 1 | 4 (16 µs during 25% low pulse |

In this example, all bit weights are binary. However, particular embodiments of the present invention may utilize non-binary bit weights. Furthermore, LSBs created during the low pulse time interval may also be non-binary. These non-binary LSBs may be displayed using dithering techniques such as Blue-Noise STM, which may show the bits without creating non-linearity errors in the color shades for each color.

In the embodiment discussed above, the light output of the lamp may be reduced to approximately 25% of its normal output. Other embodiments may reduce the output of the lamp by other amounts within the teachings of the present invention. For example, in one embodiment the light output from the lamp could be reduced to 75%, 50%, or 25% of the normal light output. Furthermore, particular embodiments of the present invention could vary the level of reduction in the light output during a single frame. For example, the first low pulse in a frame could be 25% of the normal light output, while the second low pulse of the frame could be 50% of the normal light output. Many other possibilities exist for the low pulse amplitude and PWM bit timing used in accordance with the teachings of the present invention. Furthermore, the width and shape of the low pulse may also take many forms depending on the desired implementation, all falling within the teachings of the present invention.

Figure 3:
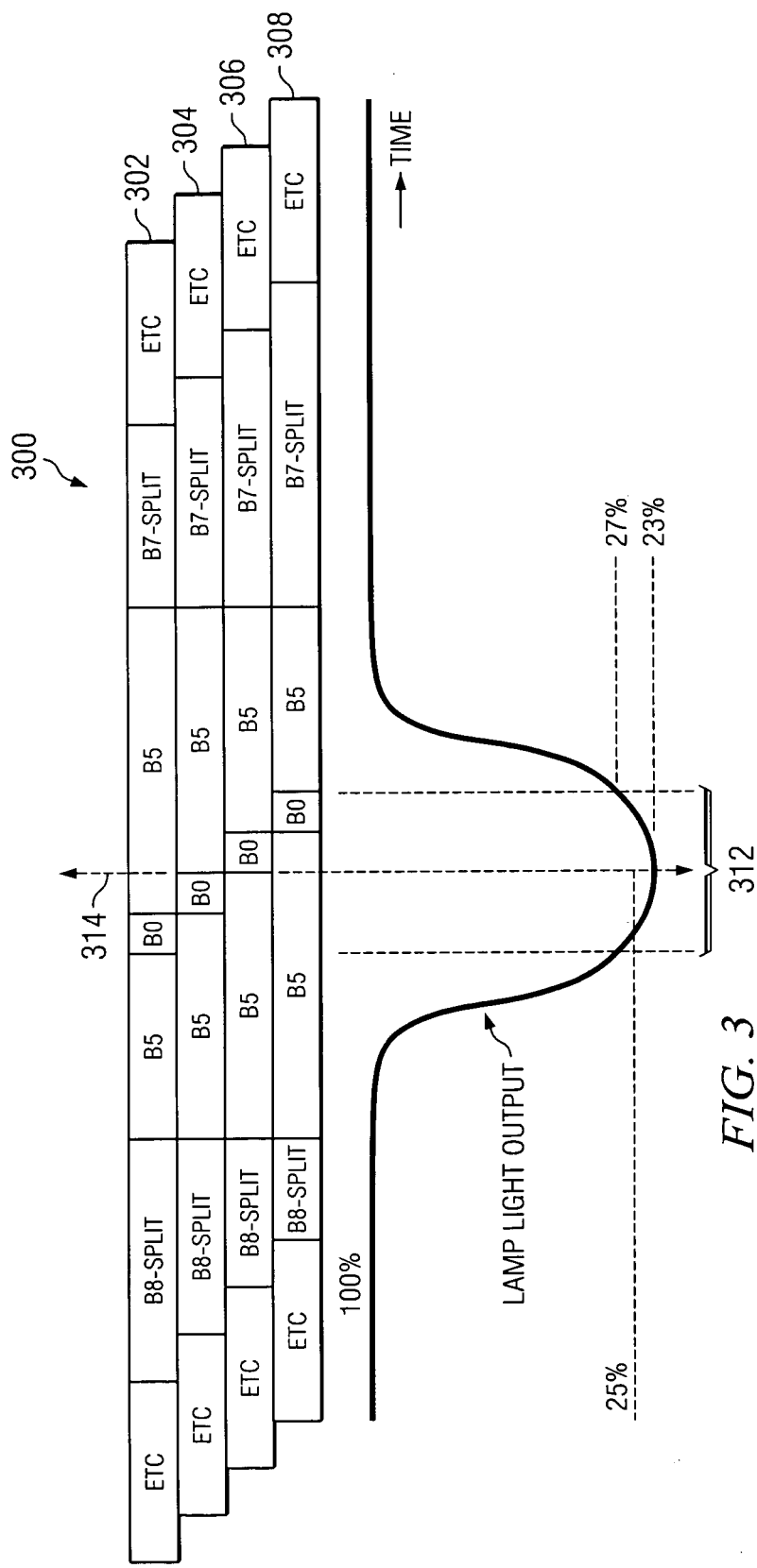
FIG. 3 illustrates a low pulse interval in accordance with a particular embodiment of the present invention.

FIG. 3 illustrates low pulse interval 300, which is one example of a low pulse time interval in accordance with a particular embodiment of the present invention. As shown in FIG. 3, low pulse interval 300, corresponding to a reduction in light output exhibited by low pulse 312, comprises fours reset blocks, reset blocks 302, 304, 306, and 308. In a typical DMD video display system there are sixteen reset blocks. However, FIG. 3 illustrates a simplified system as an example. With the benefit of this disclosure, one of ordinary skill in the art should be able to apply the teachings of the preset invention to systems having other than four reset blocks.

In low pulse interval 300, an approximately 25% light reduction occurs during low pulse 312. Due to the physical constraints of the lamp and power supply, the light reduction during the low pulse may not be perfectly square. Therefore, the DMD sequence during low pulse interval 300 may be written so that the bits comprehend the non-square shape of the pulse. Since the DMD is loaded top to bottom sequentially in time and reset sequentially, the weight of the bit being displayed will change for each reset block due to the non-square low pulse. Therefore, the bits in FIG. 3 are arranged such that the bit weight errors in the non-LSBs (B5 in this example) displayed during the low pulse are very low due to the fact that each side of the pulse is symmetric about vertical axis 314 of the low pulse 312. The mirror image of B5 for each reset block occurs about vertical axis 314 so that the errors on the left side of B5 may be cancelled by the errors on the right side of B5. The LSB itself (B0 in this example) is applied during the low time of the pulse where the pulse is flattest. Since the block-to-block reset error is smallest during this time, objectionable artifacts for B0 may be minimized or avoided. Since low pulse 312 is symmetric about axis 314, B5 will also have the same weight in each reset block. Because of this, in particular embodiments of the present invention, the bit weights for B5 in each reset block do not need to be corrected.

Still, in the example shown in FIG. 3, slight errors may exist from reset block to reset block for bit weights B0 and B5. However, these errors may be reduced or eliminated using "clock dropping" during the low pulse in each reset block. Generally, during clock dropping, the master clock running the video display system is slowed down, effectively increasing the duration of the light during the low pulse. This assures that each reset block during the low pulse has the same amount of integrated light energy, effectively "squares up" the bottom of the low pulse, which as mentioned above may not be perfectly square.

Generally, the amount of clock dropping may be controlled using a sensor in the projector to sense lamp light. Therefore, referring back to FIG. 1, video display system 100 also includes light sensor 124 which is used to detect the amount of light output by pulsed lamp 102. This information is fed into controller 126, which determines the proper amount of clock dropping to apply to master clock 128 based upon the light output detected by light sensor 124. In particular embodiments, controller 126 may also adjust the power supplied to lamp 102 by power supply 104 based upon the light output detected by light sensor 124. As shown in FIG. 1, light sensor 124 is positioned in the path of the illumination light beam between lamp 102 and first optics group 106. However, it should be recognized that lamp sensor may be positioned at other points along the path of the illumination light beam within video display system 100, provided that such locations allow the sensor to adequately detect the amount of light output by lamp 102 in accordance with the present invention.

Other embodiments of the present invention may forego using a sensor to facilitate the clock dropping routing. In place of using a sensor to determine the amount of light output by lamp 102 (and thus the shape of the pulse), some embodiments may use a RAM look-up table to determine the amount of clock dropping to employ during various times of the low pulse. Such a look-up table may help reduce overall system cost. However, an approach such as this may only work if the shape of the waveform is repeatable over the life of the projector.

Figure 4:
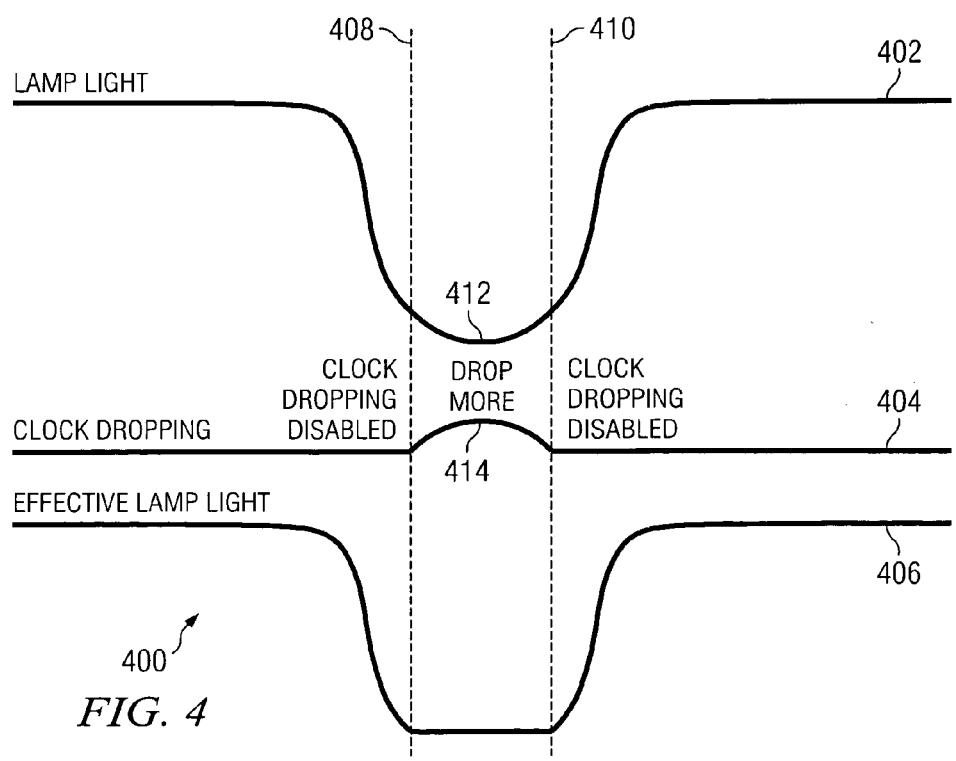
FIG. 4 illustrates the effect of clock dropping on the low pulse of a particular embodiment of the present invention.

The effect of clock dropping during the low pulse of one embodiment is shown in FIG. 4. As shown in FIG. 4, lamp light 402 has a low pulse 412 of approximately 100 μs between time 408 and time 410. During this low pulse, however, the light output by the lamp is not a uniform amount. Rather, the light output dips. Ideally, the light output during the low pulse would be uniform. Therefore, to compensate for the non-uniformity, clock dropping 414 is enabled (or increased) during the low pulse, speeding up the sequence when the light output is above 25% and slowing down the sequence when the light output is below 25%. This result of this is shown in the effective lamp light 406, which has a uniform effective light output between times 408 and 410, i.e., the duration of low pulse 412. Effectively, the clock dropping has "squared up" the bottom of the low pulse.

In the example shown in FIG. 4, it is assumed that the sequence only needs to be slowed down with clock dropping during low pulse. However, other embodiments of the present invention may employ clock dropping routines at other times. For example, clock dropping may run throughout the entire low pulse waveform shown in FIG. 4, rather than just during low pulse 412. Employing clock dropping in such a manner will make the entire waveform square, rather than just flattening the bottom of the low pulse.

Thus, by decreasing the light output from the light source of a spatial light modulator-based video display system, and displaying lower significance, or "short," bits during the reduced light output, particular embodiments of the present invention offer the ability to increase the bit-depth of the video display system despite the mechanical limitations of the spatial light modulator. In particular embodiments, this increased bit-depth may reduce the appearance of spatial contouring artifacts and/or temporal artifacts due to dither noise.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method for increasing the bit-depth of a video display system, comprising:
   illuminating a digital micro-mirror device with a light source having a variable power supply;
   receiving a signal indicating the light output provided to the digital micro-mirror device by the light source should be reduced to a target level during a predetermined time period;
   reducing a power supplied to the light source by the variable power supply in response to the signal such that the light output of the light source is reduced to about a target level during the predetermined time period;
   displaying a least significant bit on the digital micro-mirror device during the predetermined time period;
   displaying at least a portion of a non-least significant bit on the digital micro-mirror device during the predetermined time period, the display of the least significant bit temporally interrupting the display of the at least a portion of the non-least significant bit; and
   decreasing a speed of a master clock controlling the digital micro-mirror device in response to the light output of the light source deviating below the target level during the predetermined time period.

2. A video display system, comprising:
   a spatial light modulator;
   a light source operable to illuminate the spatial light modulator;
   a variable power supply operable to change a light output of the light source from a first level to a second level; and
   a controller operable to synchronize a display, by the spatial light modulator, of a least significant bit and multiple portions of a non-least significant bit, each portion having a respective start time, with a change in the light output of the light source from the first level to the second level.

3. The system of claim 2, wherein the spatial light modulator comprises a digital micro-mirror device.

4. The system of claim 2, wherein the variable power supply is operable to reduce the light output of the light source by reducing a power supplied to the light source.

5. The system of claim 2, wherein the light output at the second level is from about 25% to about 75% of the light output at the first level.

6. The system of claim 2, further comprising a master clock operable to control a timing of the spatial light modulator;
   wherein a speed of the master clock is operable to be reduced when the light output from the light source is below the second level.

7. The system of claim 6, further comprising a light sensor operable to detect the light output from the light source;
   wherein the light output detected by the light sensor is used to determine whether to adjust the speed of the master clock.

8. A method for increasing the bit-depth of a video display system, comprising:
   illuminating a spatial light modulator with a light output of a light source;
   receiving a first signal indicating the light output provided to the spatial light modulator by the light source should be changed from a first level to a second level during a first time period;
   changing the light output of the light source from about the first level to about the second level during the first time period in response to the first signal, and
   displaying a least significant bit and the least portion of a non-least significant bit on the spatial light modulator during the first time period, the display of the at least a portion of the non-least significant bit comprising at least two display times separated by a time gap, a start time of the at least two display times and a stop time of the at least two display times substantially symmetrical with respect to a midpoint of the first time period.

9. The method of claim 8, wherein the spatial light modulator comprises a digital micro-mirror device.

10. The method of claim 8, wherein the first time period corresponds to a low pulse interval of the light source.

11. The method of claim 8, wherein changing the light output of the light source comprises changing a power supplied to the light source by a variable power supply.

12. The method of claim 8, wherein the light output at the second level is from about 25% to about 75% of the light output at the first level.

13. The method of claim 8, further comprising:
   detecting the light output of the light source during the first time period; and
   altering a speed of a master clock controlling the spatial light modulator in response to the light output of the light source deviating from the second level during the first time period.

14. The method of claim 13, wherein detecting the light output from the light source comprises using a light sensor placed within a light path of the video display system.

15. The method of claim 13, wherein the speed of the mater clock is reduced if the light output is below the second level and increased if the light output is above the second level.

\* \* \* \* \*